US012692339B2

(12) United States Patent
Legrand et al.

(10) Patent No.: US 12,692,339 B2
(45) Date of Patent: Jul. 28, 2026

(54) AROMATIC POLYOL-STABILIZED RESOL RESIN

(71) Applicant: SAINT-GOBAIN ISOVER, Courbevoie (FR)

(72) Inventors: Aurélie Legrand, Paris (FR); Edouard Obert, Fleurines (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 659 days.

(21) Appl. No.: 18/013,575

(22) PCT Filed: Jun. 29, 2021

(86) PCT No.: PCT/FR2021/051191

§ 371 (c)(1),
(2) Date: Dec. 29, 2022

(87) PCT Pub. No.: WO2022/003289

PCT Pub. Date: Jan. 6, 2022

(65) Prior Publication Data

US 2023/0340180 A1     Oct. 26, 2023

(30) Foreign Application Priority Data

Jun. 29, 2020     (FR) ...................................... 2006774

(51) Int. Cl.
| | |
|---|---|
| *C08G 14/06* | (2006.01) |
| *C08K 5/13* | (2006.01) |
| *D04H 1/4209* | (2012.01) |
| *D04H 1/64* | (2012.01) |

(52) U.S. Cl.
CPC ............... *C08G 14/06* (2013.01); *C08K 5/13* (2013.01); *D04H 1/4209* (2013.01); *D04H 1/64* (2013.01); *C08G 2330/00* (2013.01)

(58) Field of Classification Search
CPC ...... C08G 14/06; C08G 2330/00; C08G 8/36; C08G 8/10; C08G 8/16; C08G 8/22; C08G 2261/1422; C08G 2261/1424; C08G 2261/31; C08K 5/13; D04H 1/4209; D04H 1/64; C02F 1/40; C10G 29/22; C10G 2300/206
See application file for complete search history.

(56) References Cited

U.S. PATENT DOCUMENTS

| | | | |
|---|---|---|---|
| 2006/0128888 A1* | 6/2006 | Tetart | C03C 25/34 |
| | | | 524/841 |
| 2009/0304919 A1 | 12/2009 | Wagner et al. | |
| 2015/0152284 A1 | 6/2015 | Gignoux et al. | |

FOREIGN PATENT DOCUMENTS

| | | |
|---|---|---|
| JP | 2019173234 A | 10/2019 |
| RU | 2286364 C2 | 10/2006 |

OTHER PUBLICATIONS

International Search Report issued Nov. 2, 2021 in PCT/FR2021/051191 (with English translation), 5 pages.
Collection of Methodological Recommendations on Invention Examination Issues, edited by VNIIPI, Moscow, 1982 (D7, 47 pages).
English translation of Office Action issued Nov. 29, 2024, in corresponding Russian Patent Application No. 2023101815, 19 pages.
English translation of the Office Action issued Apr. 25, 2025, in corresponding Russian Patent Application No. 2023101815, 13 pages.
English translation of the Office Action issued Jan. 28, 2025, in corresponding Japanese Patent Application No. 2022-581616, 5 pages.
N.I. Basov et al., Quality Control of Polymer Materials, ed. by V.A. Braginsky, 2nd ed., revised, Leningrad, Chemistry Publishing House, 1990, 112 pages (D5, p. 12, paragraphs 1-2 from the bottom).
Y.A. Moskvitchev et al., "Theoretical Foundations of Chemical Technology: Study Guide, 2nd ed., revised, St. Petersburg:" Lan Publishing House, 2016 (D6, p. 6, paragraphs 3-4 from the top).
Y.G. Papulov, Relation of the Properties of Substances to Molecular Structure: Mathematical Modeling, Advances in Modern Natural Science, 2006, No. 2, pp. 75-76.

* cited by examiner

*Primary Examiner* — Shane Fang
(74) *Attorney, Agent, or Firm* — Element IP, PLC

(57) ABSTRACT

The invention relates to a stabilized resol resin comprising water, a water-soluble amino phenol resin and a water-soluble aromatic polyol, as a solubilizer for the water-soluble amino phenol resin. The invention also relates to a diluted aqueous binder composition containing such a stabilized resol resin and additives, and to a method for producing a fibrous insulation product using such an aqueous binder composition.

15 Claims, No Drawings

AROMATIC POLYOL-STABILIZED RESOL RESIN

The present invention relates to an amino resol resin, stabilized by a solubilizer selected from water-soluble aromatic polyols, to an aqueous binder composition prepared from this resin, to a method for manufacturing an insulating product based on fibers, in particular based on mineral wool, using this aqueous binder composition, and to a thermally and/or acoustically insulating product obtained by this manufacturing method. The use of a water-soluble polyhydroxylated aromatic compound as solubilizer or co-solvent for the resin makes it possible to partially or completely replace the urea commonly used in this type of resin.

The manufacture of insulating products based on mineral wool generally comprises a step of manufacturing glass or rock fibers by a centrifugation method (fiberization). On their path between the centrifugation device and the fiber collecting belt, an aqueous binder composition, also referred to as sizing composition, is sprayed onto the still-hot fibers, which binder then undergoes a thermosetting reaction at temperatures of approximately 200° C.

The aqueous binder compositions are prepared shortly before they are used by diluting a concentrated thermosetting resin with water and by adding various commonly used additives (coupling agents, anti-dusting additives, hydrophobic agents, catalysts).

The concentrated thermosetting resins must be storage-stable, that is they must not precipitate out and must retain, for as long as possible, their ability to be diluted with water at the time the sizing composition is prepared. A thermosetting resin is generally considered to be stable when, after a storage period of at least 14 days at a temperature of between 12 and 18° C., it is still in the state of a solution free of precipitate and retains dilutability of at least 1000% (the addition of 9 volumes of water to 1 volume of resin giving a clear solution, free of permanent cloudiness).

Moreover, from a regulatory perspective, the resin must be considered to be non-polluting, that is it should contain- and should generate during the use thereof—the minimum possible amount of compounds that can be harmful to human health or to the environment.

The thermosetting resins most commonly used are phenolic resins of the resol class. In the technical field of phenol-formaldehyde resins, a distinction is mainly made between two families, namely:

novolac resins prepared in acid medium, and resols obtained by basic catalysis.

The phenolic resins of the present invention belong to this second family.

Resol resins are obtained in basic medium by reaction of phenol with an excess of formaldehyde, the formaldehyde/phenol molar ratio typically being between 2 and 4, each molecule of phenol potentially being able to react with three molecules of formaldehyde.

The resol resins thus obtained contain numerous methylol functions borne by an aromatic ring, which constitute sites for crosslinking by dehydration/releasing formol. These resins substantially consists of phenol/formaldehyde (PF) condensates, residual phenol and residual formaldehyde. In acid medium they react, that is they polymerize, very rapidly at ambient temperature, and precipitate.

In order to reduce the amount of residual formaldehyde and to improve the storage-stability of the resins, it has been proposed firstly to add to the resin, after neutralization of the catalyst, a sufficient amount of urea which reacts with the free residual formaldehyde, forming urea-formaldehyde (UF) condensates. Such a resin therefore contains phenol-formaldehyde (PF) and urea-formaldehyde (PF) condensates. Nonetheless, it was found that these resins released formaldehyde at the time of the crosslinking step by thermal degradation of the urea-formaldehyde condensates. Formaldehyde was also released from the finished product during the use thereof as a thermal and/or acoustic insulator. Such urea-treated resols and the preparation thereof are described in detail in international application WO01/96254.

A few years ago, the Applicant proposed improved resol resins, hereinafter referred to equally as "amino resins" or "amino phenol resins", which are storage-stable and substantially free of urea-formaldehyde (UF) resins.

These amino phenol resins are water-soluble resins which are stable at acid pH, even at very acid pH of between 1 and 2. This good stability is obtained by virtue of an additional reaction step which consists in reacting the resols, substantially consisting of phenol/formaldehyde condensates, phenol and formaldehyde with an amine, preferably a monoalkanolamine, and in particular monoethanolamine.

This alkanolamine reacts according to the Mannich reaction with the phenol/formaldehyde (PF) condensates, and with the residual phenol and formaldehyde, to form phenol/formaldehyde/amine (PFA) condensates. At the end of the reaction, the reaction mixture can be acidified without this causing polymerization at ambient temperature. These amino resols are therefore considered to be stable in acid medium. The synthesis thereof is described in applications WO2008/043960 and WO2008/043961 from the Applicant. They are further distinguished by being free of urea-formaldehyde condensates. As explained above, these undesirable UF condensates are present in large amounts in numerous phenolic resins of the prior art and have insufficient thermal stability, releasing formaldehyde by thermal decomposition.

In a known way, it is possible to add, to the amino phenol resin after reaction with the monoalkanolamine, cooling of the reaction mixture and acidification, up to 25% by weight, preferably between 10% and 20% by weight of urea, these amounts being expressed relative to the total dry weight of the amino resol. The urea then serves chiefly as co-solvent or solubilizer and makes it possible to further reduce the cost of the sizing compositions and products obtained. The urea also scavenges traces of formaldehyde which might still be present at the end of synthesis (less than 0.2%).

Amino phenol resins, in aqueous solution stabilized by urea (solubilizer), have thus been used for more than ten years by the Applicant for the manufacture of insulating products based on mineral fibers which release very low amounts of formaldehyde during production and during use.

The only disadvantage of these resins lies in the fact that ammonia ($NH_3$), a product of the thermal degradation of the urea, is formed during the thermal curing step at the production site and also, to a lesser extent, during use.

The aim of the present invention was to propose a solubilizer or co-solvent different from urea which:

is capable of stabilizing an aqueous solution of amino phenol-formaldehyde resin at least as efficiently as urea (absence of crystals and dilutability of greater than 1000% for at least 14 days), does not release ammonia or any other toxic substances when it is subjected to the temperatures for curing resol resins, typically of between 18° and 230° C., and is preferably not classified among carcinogenic, mutagenic and reprotoxic (CMR) chemicals.

The Applicant tested a large number of organic compounds, in particular amino acids, (poly) aldehydes, aromatic and non-aromatic polyols and hydrocarbons, but only water-soluble aromatic polyols proved sufficiently effective in stabilizing amino phenol resins in concentrated solution in water for at least 14 days.

The inventors observed that some polyhydroxylated aromatic compounds were even more effective stabilizers than urea, making it possible to use less thereof and to at least partially compensate for the higher cost of these compounds compared to the cost of urea.

Consequently, the subject of the present invention is a stabilized resol resin, comprising (a) water, (b) a water-soluble amino phenol resin, preferably consisting substantially of phenol-formaldehyde (PF) condensates and phenol-formaldehyde-amine (PFA) condensates, and (c) a water-soluble aromatic polyol, as a solubilizer for the water-soluble amino phenol resin.

Another subject of the present invention is an aqueous binder composition prepared from resol resin stabilized by dilution and addition of common additives. This aqueous binder composition therefore comprises water (for dilution), the stabilized resol resin defined above, and one or more additives selected from coupling agents, anti-dusting oils or emulsions, hydrophobizing agents and curing reaction accelerators.

Finally, a subject of the invention is a method for manufacturing an insulating product based on organic or mineral fibers, using the aqueous binder composition, and also an insulating product obtained by this method, wherein the organic or mineral fibers are bonded together by an insoluble and infusible binder obtained by curing ingredients of the aqueous binder composition.

Throughout the description of the present invention, it is necessary to make a distinction between:

the amino phenol resin, obtained by condensation of phenol, formaldehyde and amine in a basic medium and which is free of urea-formaldehyde (UF) condensates, the stabilized resol resin which contains the amino phenol resin, water, and the solubilizer, and the binder composition prepared by diluting the stabilized resol resin and adding known additives such as coupling agents, anti-dusting agents, hydrophobizing agents and catalysts or accelerators.

The stabilized resol resin is therefore the concentrated resin resulting from the synthesis, which will be stored, transported, sold and used as a thermosetting component for the preparation of the aqueous binder composition, shortly before the implementation of the manufacturing method.

It advantageously contains:

from 75 to 99% by weight, preferably from 80 to 97% by weight, in particular from 85 to 95% by weight, of water-soluble amino phenol resin, and from 1 to 25% by weight, preferably from 3 to 20% by weight, in particular from 5 to 15% by weight, of a water-soluble aromatic polyol, these percentages being relative to the total dry weight of the stabilized resol resin.

The water content thereof is generally between 30 and 60%, preferably between 35 and 55%, and in particular between 40 and 50% by weight.

The expression "a water-soluble aromatic polyol" used to describe the solubilizer encompasses both pure compounds used alone and also mixtures of two or more water-soluble aromatic polyols.

The resin also contains small amounts of salt resulting from the neutralization of the catalyst (strong base such as NaOH or KOH) by an acid, for example sulfamic acid, at the end of the synthesis of the resin.

The adjective "stabilized" relating to the resol resin means, in the present invention, that the resin remains in the form of a clear solution free of precipitate for at least 14 days of storage at a temperature of 12 to 18° C. and that, during this period, it retains dilutability in water of at least 1000%.

The solubilizer used in the present invention to at least partially replace the urea hitherto used is selected from water-soluble aromatic polyols which are preferably not among carcinogenic, mutagenic and reprotoxic (CMR) chemicals. The list of CMR chemical compounds is that which is featured in appendix VI, of EC regulation No 1272/2008.

In the present application, the water-soluble aromatic polyols are considered to be those having a solubility in water at 20° C. of greater than 20 g/l, preferably greater than 50 g/l.

The aromatic nature is an important aspect of the solubilizers used in the present invention. Indeed, the Applicant tested a certain number of non-aromatic polyhydroxylated compounds such as glycerol, carbohydrates and hydrogenated sugars (alditols) which are indeed water-soluble and not classified as CMR, but they are ineffective in stabilizing the phenolic resin, that is in conserving the dilutability of the resin for at least 14 days of storage at a temperature of 12-18° C. and preventing the crystallization thereof in the event of storage at low temperature (3° C.). It is likely that the aromatic nature of the polyols increases their affinity for the phenolic resin, which is itself aromatic, and thus increases the solubility of said phenolic resin in water.

The solubilizers used in the present invention comprise at least two hydroxyl groups. The hydroxyl groups are preferably located directly on the aromatic ring. The solubilizer can comprise a monocyclic aromatic ring (benzene) or a polycyclic aromatic ring (naphthalene, anthracene). It is advantageously monocyclic or bicyclic, preferably monocyclic, and bears at least two, preferably two or three, hydroxyl functions located directly on the aromatic ring.

By way of examples of polyhydroxylated aromatic compounds which can be used as solubilizer in the present invention, mention may be made of unsubstituted polyphenols resorcinol, phloroglucinol and pyrocatechol, substituted polyphenols bearing aldehyde, carboxylic acid, alkyl and ether substituents, such as gallic acid, 3,4-dihydroxybenzoic acid, 2,4-dihydroxybenzoic acid, 2,4-dihydroxybenzaldehyde, 2-hydroxy-3-methoxybenzaldehyde, 4-methoxybenzene-1,2-diol, 4-methoxybenzene-1,3-diol, and mixtures thereof.

Among these compounds, particular preference is given to resorcinol and phloroglucinol. Indeed, these compounds are capable both of solubilizing the amino phenol resin in water and of scavenging the traces of free formaldehyde (less than 0.2%) which might be present in the amino phenol resin at the end of the synthesis. Indeed, as is known, resorcinol and phloroglucinol are capable of reacting with formaldehyde and forming aromatic compounds having methylol function(s) which are capable of reacting with the PF and PFA condensates of the phenolic resin.

When the water-soluble aromatic polyol(s) used are capable of reacting with formaldehyde, the addition of urea to the resol resin is in principle superfluous, and the stabilized resol resin of the present invention is then preferably free of urea. Indeed, the total absence of urea guarantees the absence of ammonia ($NH_3$) emissions during the step of thermal curing of the binder and during the use of the manufactured insulating product.

When use is made of a solubilizer which, unlike resorcinol, is not capable of scavenging the traces of formaldehyde, it may be useful to add a small amount of urea to the resol resin to be stabilized. This addition may take place before or after the addition of the polyhydroxylated aromatic solubilizer, but must take place after the end of the synthesis of the amino phenol resin consisting substantially of PF and PFA condensates, that is after the reaction solution has been cooled and neutralized. Indeed, it is necessary to prevent the formation of urea-formaldehyde concentrates during the synthesis of the resin.

Although, by virtue of the present invention, it is technically possible to entirely dispense with urea, the addition of the latter to the resol resin often remains beneficial from an economic perspective.

When use is made both of urea and a water-soluble aromatic polyol as solubilizer, the resin advantageously contains less than 15% by weight, for example from 0.1 to 15% by weight, preferably less than 10% by weight, for example from 0.5 to 10% by weight, in particular less than 5% by weight, for example 1 to 5% by weight of urea, relative to the total dry weight of the stabilized resol resin (amino phenol resin+aromatic polyol+urea).

The urea/aromatic polyol weight ratio is then generally between 1/4 and 3/1, preferably between 1/3 and 2/1, in particular between 1/2 and 1.

The phenolic resin used in the present invention contains basic (protonizable) amine functions and is stable in acid medium.

These phenolic resins containing amine functions are known and the preparation thereof is described in detail in applications WO2008/043960 and WO2008/043961 by the Applicant. They substantially consist of phenol/formaldehyde (PF) condensates and phenol/formaldehyde/amine (PFA) condensates and are distinguished especially by the absence of urea-formaldehyde (UF) condensates. As explained in the introduction, these urea-formaldehyde condensates are present in large amounts in numerous other phenolic resins of the prior art and have insufficient thermal stability, releasing formaldehyde and ammonia by thermal decomposition.

The stabilized resol resin of the present invention advantageously has a pH of between 1.0 and 6.5, preferably between 1.5 and 5.5, more preferentially between 1.6 and 5.0.

The aqueous binder compositions prepared by diluting the stabilized resol resin with water generally have a less acid pH than the resol resins, typically of between 3 and 7, in particular between 3.5 and 6.5, which is advantageous for preventing the corrosion of the facilities for manufacturing the insulating products. The dilution water used for preparing the binder compositions from the stabilizer resol resin may originate in part from the washing water recycled from the facilities for manufacturing the insulating product.

The binder composition of the present application thus contains water, a stabilized resol resin and one or more additives commonly used in the field of insulating products based on mineral wool.

These additives are selected inter alia from coupling agents, especially functional silanes such as aminosilanes or epoxysilanes, anti-dusting oils or emulsions, in particular mineral oils, hydrophobizing agents such as reactive or unreactive polyorganosiloxanes (silicones) and accelerators of the curing reaction.

At the moment of application to the fibers, the binder composition preferably has a solids content of between 2 and 25% by weight, preferably between 3 and 15% by weight. It thus contains from 75 to 98% by weight, in particular from 85 to 97% by weight, of water.

In a preferred embodiment, the aqueous binder composition is free of urea.

The binder composition is applied in an amount such that the content of insoluble and infusible binder of the final product obtained after thermal curing is between 2% and 20% by weight, preferably between 3% and 15% by weight, in particular between 4 and 12% by weight.

Another subject of the present invention is a method for manufacturing an insulating product based on mineral or organic fibers. This method comprises the following successive steps:

applying an aqueous binder composition according to the invention to mineral or organic fibers, preferably mineral fibers, and heating the fibers bonded with the aqueous binder composition so as to evaporate the volatile phase of the aqueous binder composition and to bring about the thermal curing of the non-volatile residue, or packaging the mineral or organic fibers bonded with the uncured aqueous binder composition for the purpose of storage and/or transport.

The mineral fibers are advantageously selected from mineral wool fibers, particularly glass wool or rock wool.

When the insulating product is a product based on mineral wool, the binder composition is projected by spraying onto the mineral fibers at the outlet of the centrifugation device (fiberization) and before the mineral fibers are collected on the receiving member (forming) in the form of a layer of fibers, which is then treated in an oven at a temperature enabling the crosslinking of the reactive ingredients and the formation of an infusible binder (curing). This crosslinking/thermal curing step is carried out by heating to a temperature of greater than or equal to 180° C., preferably of between 190° C. and 220° C., for a duration of between 20 seconds and 300 seconds, preferably between 30 and 250 seconds.

When the insulating product is a product based on organic fibers such as fibers of plant origin, for example cellulose fibers, or animal origin, such as wool, the curing temperature is generally lower than that used for curing products based on mineral fibers, in order to save the organic fibers from potential thermal degradation. The curing temperatures are for example between 15° and 200° C. The curing duration is generally between several minutes and several tens of minutes, for example between 5 and 50 minutes, preferably between 10 and 30 minutes.

In the method of the present invention, the curing of the mineral or organic fibers may be carried out immediately after application of the binder composition to the fibers and collection of the bonded fibers on a conveyor belt, for example by passing into a temperature-controlled oven at the desired curing temperature.

The method of the present application also covers an embodiment in which the mat of bonded fibers is not immediately cured but is packaged, for example partially dried, cut, compressed, shaped and wrapped, with a view to a curing step separate from the step of manufacture of the mat of bonded fibers.

The packaging material must be chosen so as to enable storing and/or transporting these intermediate products (fibers bonded with an uncured binder) with a view to an additional method step, implemented subsequently or in a different location, and comprising the thermal curing of the binder, optionally after shaping the intermediate product, for example in a mold.

The packaging material is preferably a plastic film.

EXAMPLES

Synthesis of Non-Stabilized Resol Resin 380 g of phenol (4 mol), 313 g of paraformaldehyde used as formaldehyde source (10 mol), and 367 g of water (paraformaldehyde/phenol molar ratio equal to 2.5) are introduced into a 2-liter reactor with a condenser overhead and equipped with a stirring system, and the mixture is heated to 45° C. with stirring.

53.2 g of a 50% sodium hydroxide solution (that is 7% by weight relative to the phenol) are then added regularly over a period of 30 minutes, then the temperature is gradually raised to 70° C. in 30 minutes and maintained for 80 minutes.

The temperature is then gradually reduced to 60° C. over a period of 30 minutes while simultaneously regularly adding 71.5 g of monoethanolamine (1.17 mol) to the reaction mixture. The temperature is maintained at 60° C. for 15 minutes, the mixture is cooled to approximately 35° C. in 30 minutes and sulfamic acid is added, in 60 minutes, until the pH is equal to 5.0. Sulfamic acid at 15% in solution is then used to lower the pH to 4.5. If necessary, the content by weight of solids in the liquid resin is adjusted to 58% with water.

The resin obtained has the appearance of a clear aqueous composition: it has a free formaldehyde content equal to 0.1%, a free phenol content equal to 0.5% (these contents being expressed relative to the total weight of the liquid) and a dilutability of greater than 2000%. It is referred to as non-stabilized resol resin.

Preparation of Stabilized Resol Resins

The non-stabilized resol resin is divided up into several batches and a stabilizer to be tested is added to each batch in an amount equal to 20 parts per 80 parts dry weight of resin, for those with sufficient solubility, and in an amount equal to 10 parts by weight per 80 parts dry weight of non-stabilized resol resin for those with insufficient solubility (see Table 1). Stirring is carried out at ambient temperature until complete dissolution is achieved, so as to obtain so-called "stabilized" resol resins the stability of which is to be evaluated.

Two batches of stabilized resol resin are also prepared by adding, under the same conditions, respectively 5 parts of resorcinol and 5 parts of phloroglucinol to 80 parts of non-stabilized resol resin.

Dilutability

The dilutability over time of the different resol resins is evaluated, said resins being prepared in the following way: 10 ml of the resin are poured into a 250 ml Erlenmeyer flask. 10 ml of water are added, the mixture is stirred and it is verified whether or not cloudiness appears. When the solution remains clear, another 10 ml of water are added and the clarity of the solution is evaluated again. The cycle is repeated until permanent cloudiness appears (dilutability= (number of additions+1)×100) or when 10 ml of water have been added 19 times without any cloudiness appearing. In the latter case, the resin has a dilutability of 2000% and it is considered to be infinitely dilutable.

Crystallization Stability

To evaluate the crystallization stability of the resol resins, 20 ml of resin are poured into a glass tablet organizer and they are stored at 3° C., being checked at regular intervals for the appearance or absence of crystals. The crystallization stability is defined as the number of days of storage at 3° C. without the appearance of white crystals at the bottom of the tablet organizer.

Free Formaldehyde Content

The free formaldehyde content of the resol resins is also evaluated in order to verify the ability of the stabilizer to react with the residual formol (formaldehyde scavenger function).

To this end, approximately 1 g of resol resin is taken in a 100 ml volumetric flask and the mass m sampled is noted precisely. Distilled water is added up to the filling mark. The formol content is determined using a LANGE DR6000 colorimeter provided with an LCK 325 formol quantification kit, following manufacturer's instructions.

The measurement is taken on 1 ml of the sample taken in the preparation flask. The result A obtained by the colorimeter is given in mg/l. The free formaldehyde content is calculated as follows: % free formaldehyde=(A×0.1)/m×100

The free formaldehyde content is given in % of the sample, expressed to +0.01%. Any result lower than 0.01% is denoted<0.01%.

Ammonia Emissions

Finally, the ammonia emissions on curing the different resol resins are evaluated by carrying out pollution simulations in the laboratory. A resol resin solution corresponding to 1 g of solids, diluted beforehand to give a solids content of 30%, is introduced into a 1l flat-bottomed glass flask. The inlet of a dipper is connected to the flat-bottomed flask so as to sweep the surface of the sample with an air flow rate of 1 l/min. The assembly is placed into a ventilated oven preheated to 215° C. The outlet of the dipper is connected to three bubblers arranged in series outside the oven, each containing 100 ml of a 0.02 N sulfuric acid solution. After one hour of curing, the contents of the bubblers is analyzed by ion chromatography in order to quantify the amount of scavenged ammonia.

The measurement results are collated in Table 1 below for all the substances tested as stabilizer, which are potential candidates for replacing urea.

TABLE 1

| Substance tested as stabilizer | Parts of substance tested per 80 parts of resin | Free formaldehyde content (%) | Number of days of dilutability >1000% | Number of days without crystal formation | Ammonia emissions (mg/m³) |
|---|---|---|---|---|---|
| — | — | 0.11 | 16 | <10 | < detection limit |
| resorcinol | 20 | <0.01 | 41 | >30 | 17 |
| resorcinol | 5 | <0.01 | 22 | 15 | 12 |
| phloroglucinol | 5 | <0.01 | 24 | 10 | 6 |
| urea | 20 | <0.01 | 24 | 14 | 310 |
| dextrose | 20 | 0.09 | 14 | <10 | < detection limit |
| sorbitol | 20 | 0.10 | 16 | <10 | < detection limit |
| ethanol | 20 | 0.15 | 16 | — | 2.5 |
| phenoxyethanol | 20 | <0.01 | 17 | — | 17 |
| glycine | 10 | 0.09 | 15 | 6 | 13 |
| alanine | 10 | Formation of a gel after 48 hours | | | |
| terephthaldehyde | 10 | 0.09 | 0 | 5 | 6 |

Of all the organic compounds evaluated, only resorcinol and phloroglucinol have a stabilizing power on the resol resin which is at least equal to, or even greater than, that of urea: indeed, a dilutability of greater than 1000% and a crystallization stability over an equivalent or longer period are observed.

The resorcinol and the phloroglucinol are also capable, like the urea, of reacting with the free formaldehyde contained in the non-stabilized resol resin. When the resorcinol and the phloroglucinol are compared to urea, it is observed that ammonia emissions are greatly reduced (from 310 mg/m$^3$ to less than 20 mg/m$^3$).

The invention claimed is:

1. A stabilized resol resin, comprising water, from 80 to 97% by weight of a water-soluble amino phenol resin, and from 3 to 20% by weight of a water-soluble aromatic polyol, as a solubilizer for the water-soluble amino phenol resin, these percentages being relative to the total dry weight of the stabilized resol resin, said stabilized resol resin having a pH of between 1.0 and 6.5.

2. The stabilized resol resin according to claim 1, comprising:

from 85 to 95% by weight of the water-soluble amino phenol resin, and from 5 to 15% by weight of the water-soluble aromatic polyol, these percentages being relative to the total dry weight of the stabilized resol resin.

3. The stabilized resol resin according to claim 1, wherein the water-soluble aromatic polyol is a compound comprising a monocyclic or bicyclic aromatic ring, bearing at least two hydroxyl functions located directly on the aromatic ring.

4. The stabilized resol resin according to claim 3, wherein the water-soluble aromatic polyol is selected from the group consisting of resorcinol, phloroglucinol, pyrocatechol, gallic acid, 3,4-dihydroxybenzoic acid, 2,4-dihydroxybenzoic acid, 2,4-dihydroxybenzaldehyde, 2-hydroxy-3-methoxy-benzaldehyde, 4-methoxybenzene-1,2-diol, 4-methoxybenzene-1,3-diol, and mixtures of these compounds.

5. The stabilized resol resin according to claim 4, wherein the water-soluble aromatic polyol is selected from the group consisting of resorcinol and phloroglucinol.

6. The stabilized resol resin according to claim 1, further comprising from 0.1 to 15% by weight of urea, relative to the total dry weight of the stabilized resol resin.

7. The stabilized resol resin according to claim 1, being free of urea.

8. The stabilized resol resin according to claim 1, wherein the water-soluble amino phenol resin consists essentially of phenol-formaldehyde condensates and phenol-formaldehyde-amine condensates.

9. The stabilized resol resin according to claim 1, having a pH of between 1.5 and 5.5.

10. An aqueous binder composition comprising water, a stabilized resol resin according to claim 1, and one or more additives selected from the group consisting of coupling agents, anti-dusting oils, emulsions, hydrophobizing agents and curing reaction accelerators.

11. The aqueous binder composition according to claim 10, comprising from 75 to 98% by weight of water.

12. The aqueous binder composition according to claim 10, being free of urea.

13. A method for manufacturing an insulating product based on mineral or organic fibers, comprising applying an aqueous binder composition according to claim 10 to mineral or organic fibers, and heating the fibers bonded with the aqueous binder composition so as to evaporate the volatile phase of the aqueous binder composition and to bring about the thermal curing of the non-volatile residue, or packaging the mineral or organic fibers bonded with the uncured aqueous binder composition for the purpose of storage and/or transport.

14. The method according to claim 13, wherein the mineral fibers are mineral wool fibers.

15. An insulating product based on mineral or organic fibers, obtained by the method according to claim 13.

* * * * *